(12) United States Patent
Pfeifer et al.

(10) Patent No.: US 7,799,298 B2
(45) Date of Patent: Sep. 21, 2010

(54) CATALYST ARRANGEMENT AND METHOD OF PURIFYING THE EXHAUST GAS OF INTERNAL COMBUSTION ENGINES OPERATED UNDER LEAN CONDITIONS

(75) Inventors: Marcus Pfeifer, Solingen (DE); Nicola Soeger, Nidderau (DE); Yvonne Demel, Frankfurt am Main (DE); Tobias Kuhl, Hanau (DE); Paul Christian Spurk, Weiterstadt (DE); Jürgen Gieshoff, Gelnhausen (DE); Egbert Lox, Grebenhain (DE); Thomas Kreuzer, Karben (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 948 days.

(21) Appl. No.: 10/567,204

(22) PCT Filed: Jul. 29, 2004

(86) PCT No.: PCT/EP2004/008539

§ 371 (c)(1),
(2), (4) Date: Dec. 11, 2006

(87) PCT Pub. No.: WO2005/014146

PCT Pub. Date: Feb. 17, 2005

(65) Prior Publication Data

US 2007/0110650 A1    May 17, 2007

(30) Foreign Application Priority Data

Aug. 5, 2003  (DE) .............................. 103 35 785

(51) Int. Cl.
*B01D 53/94* (2006.01)
*B01J 35/00* (2006.01)
*F01N 3/10* (2006.01)
*F01N 3/28* (2006.01)

(52) U.S. Cl. .............. 423/213.2; 423/213.5; 423/213.7; 423/239.1; 502/300; 502/325; 502/340; 502/304; 502/344; 502/324; 502/349; 502/353; 502/305; 60/299; 60/301

(58) Field of Classification Search ............... 423/213.2, 423/213.5, 213.7, 239.1; 502/300, 325, 340, 502/304, 344, 324, 349, 353, 305; 60/299, 60/301
See application file for complete search history.

(56) References Cited

U.S. PATENT DOCUMENTS 5,492,679 A    2/1996 Ament et al.
(Continued)

FOREIGN PATENT DOCUMENTS

DE    198 20 828 A1    11/1999
(Continued)

OTHER PUBLICATIONS

International Search Report for PCT/EP2004/008539 dated Oct. 20, 2004.
(Continued)

*Primary Examiner*—Timothy C Vanoy
(74) *Attorney, Agent, or Firm*—Kalow & Springut LLP; William D. Schmidt

(57) ABSTRACT

The invention relates to a catalyst arrangement for purifying the exhaust gases of internal combustion engines operated under lean conditions. It is proposed that a thinwalled, porous carrier be coated on one side with a nitrogen oxide storage catalyst and on the other side with an SCR catalyst. When the exhaust gas is passed through the catalytic coatings and the support material, a significant improvement in the nitrogen oxide conversion is achieved compared to a series arrangement of the catalysts on separate carriers. Wall flow filters have been found to be useful as thin-walled carriers.

9 Claims, 2 Drawing Sheets

U.S. PATENT DOCUMENTS 6,455,463 B1 * 9/2002 Labarge et al. ............... 502/340
7,332,135 B2 * 2/2008 Gandhi et al. ................ 422/177
7,334,400 B2 * 2/2008 Yan et al. ...................... 60/286

FOREIGN PATENT DOCUMENTS

| EP | 0 773 354 A1 | 5/1997 |
|---|---|---|
| EP | 0 984 142 A1 | 3/2000 |
| EP | 1 033 161 A1 | 9/2000 |
| EP | 1 147 802 A1 | 10/2001 |
| WO | WO 01/12320 A1 | 2/2001 |

OTHER PUBLICATIONS

Written Opinion for PCT/EP2004/008539 dated Oct. 20, 2004.

* cited by examiner

CATALYST ARRANGEMENT AND METHOD OF PURIFYING THE EXHAUST GAS OF INTERNAL COMBUSTION ENGINES OPERATED UNDER LEAN CONDITIONS

FIELD OF THE INVENTION

The invention relates to the purification of exhaust gas from internal combustion engines operated under lean conditions, in particular purification of exhaust gas from diesel engines. The invention describes a catalyst arrangement and a method, of purifying the exhaust gas of these engines.

BACKGROUND OF THE INVENTION

Internal combustion engines operated under lean conditions will hereinafter also be referred to as lean burn engines. They are operated using a lean air/fuel mixture. Their exhaust gas therefore comprises not only the usual pollutants carbon monoxide (CO), nitrogen oxides (NOx) and unburnt hydrocarbons (HC) and particles (PM) but also a high proportion of up to 15% by volume of oxygen, so that the exhaust gas has a net oxidizing action. For this reason, the exhaust gas purification methods using three-way catalysts which are customary for stoichiometrically operated internal combustion engines cannot be employed. In particular, the conversion of the nitrogen oxides into nitrogen in the oxidizing exhaust gas atmosphere presents considerable difficulties.

The main components of the nitrogen oxides in the exhaust gas of lean burn engines are nitrogen monoxide (NO) and nitrogen dioxide ($NO_2$), with nitrogen monoxide being the predominant component. Depending on the operating conditions of the internal combustion engine, the proportion of nitrogen monoxide is from 60 to 95% by volume of the total nitrogen oxides.

For the reduction of nitrogen oxides in oxidizing exhaust gases, the method of selective catalytic reduction (SCR) has been known for a long time. Here, ammonia is added as reducing agent to the exhaust gas and this gas mixture is then passed over a catalyst for the selective catalytic reduction (SCR catalyst). The nitrogen oxides are selectively reacted with the ammonia over the SCR catalyst to form nitrogen and water. This method is now used commercially in the purification of offgases from power stations. Typical SCR catalysts comprise, for example, solid state acids from the system $TiO_2/WO_3/MoO_3/V_2O_5/SiO_2/SO_3$ as catalytically active components. Other SCR catalysts are based on acid-resistant zeolites exchanged with transition metals, for example delaminated Y zeolites, mordenite, silicalite or ZSM-5. The working temperature of these catalysts is from about 300 to 500° C.

Owing to the need to add a reducing agent to the exhaust gas, the SCR method is very complicated for use in mobile applications. For this reason, the NOx-storage technology has been developed as an alternative to the SCR method. Here, the nitrogen oxides present in the lean exhaust gas are temporarily stored in the form of nitrates on a nitrogen oxide storage catalyst. After the storage capacity of the storage catalyst is exhausted, it has to be regenerated. For this purpose, the internal combustion engine is briefly operated using a rich air/fuel mixture, i.e. more fuel than can be completely burnt by means of the combustion air is introduced into the air/fuel mixture, so that the exhaust gas is rich. It thus contains unburnt hydrocarbons. The stored nitrates are decomposed into nitrogen oxides in the rich exhaust gas and react with the unburnt hydrocarbons present in the rich exhaust gas as reducing agent to form nitrogen and water.

To store the nitrogen oxides in the form of nitrates, nitrogen oxide storage catalysts comprise basic components such as oxides of the alkali metals and the alkaline earth metals, and also of rare earth metals such as cerium oxide and lanthanum oxide. Preference is given to using barium oxide and strontium oxide. In addition, the nitrogen oxide storage catalysts further comprise catalytically active noble metals, usually platinum. The task of these noble metals is to oxidize the nitrogen monoxide which is predominantly present in the exhaust gas to nitrogen dioxide. Only this is able to react, in the presence of the water vapor in the exhaust gas, with the storage components to form nitrates. During the regeneration of the storage catalyst, the desorbed nitrogen oxides are reduced to nitrogen and water over the catalytically active noble metals.

Cyclic operation of an engine with alternate lean and rich air/fuel mixtures is necessary for the use of nitrogen oxide storage technology for the purification of the exhaust gases of lean burn engines. Here, lean operation is the normal mode of operation of the lean burn engine. During this phase of operation, the nitrogen oxides in the exhaust gas are stored by the storage catalyst (storage phase). During rich operation, the nitrogen oxides are desorbed again and reacted (desorption phase). The storage phase usually lasts for from 1 to 2 minutes, while the desorption phase requires only a brief period of from 5 to 20 seconds.

To improve the two methods described when applied to purification of the exhaust gases of lean bun engines, various solutions have become known. The European patent publication EP 0 733 354 A1 describes a selective catalytic reduction method in which the ammonia required for the reduction is generated from the nitrogen oxides present in the exhaust gas. For this purpose, the exhaust gas purification unit contains a three-way catalyst and a downstream SCR catalyst. The lean burn engine is, as in the case of the nitrogen oxide storage technology, operated alternately with rich and lean air/fuel mixtures. During operation with a rich air/fuel mixture, ammonia is formed from the nitrogen oxides present in the exhaust gas over the three-way catalyst. During this phase, the ammonia is stored on the downstream SCR catalyst. During operation with a lean air/fuel mixture, the nitrogen oxides pass the three-catalyst and are converted selectively into nitrogen and water over the SCR catalyst using the previously stored ammonia. In the method described by EP 0 733 354 A1. the ammonia is thus generated on board the vehicle and does not have to be introduced separately into the exhaust gas.

The German patent publication DE 198 20 828 A1 describes an improvement of the method of EP 0 733 354 A1. For this purpose, a nitrogen oxide storage catalyst is installed upstream of the three-way catalyst. During the lean phases, the nitrogen oxide storage catalyst stores the major part of the nitrogen oxides present in the exhaust gas. During the rich phase, the nitrogen oxides are desorbed and partly converted into ammonia by the three-way catalyst. The exhaust gas purification apparatus described by DE 198 20 828 A1 is said to give an improved degree of conversion of the nitrogen oxides compared to the apparatus of EP 0 733 354 A1.

SUMMARY OF THE INVENTION

However, both solutions are very complicated in terms of apparatus. They require at least two separate catalyst units and the conversion of nitrogen oxides which they are able to achieve has to be improved further. It is therefore an object of the present invention to provide an apparatus which has a significantly simpler construction than the apparatuses known from the prior art and makes it possible to achieve a further improvement in the conversion of nitrogen oxides.

This object is achieved by a catalyst arrangement which comprises an open-pored, porous carrier having an entry surface and an exit surface for the exhaust gas. In the catalyst arrangement, the entry and exit surfaces of the carrier are coated with different, catalytically active layers, with the catalyst layer on the exit surface being formed by a catalyst for selective catalytic reduction and the catalyst layer on the entry surface being able to store nitrogen oxides under lean exhaust gas conditions and to convert nitrogen oxides into ammonia under rich exhaust gas conditions.

BRIEF DESCRIPTION OF THE FIGURES

The invention is explained in more detail below with the aid of FIGS. 1 and 2. In the figures.

DETAILED DESCRIPTION OF THE PREFERRED EMBODIMENTS

According to the invention, the catalyst arrangement comprises only one catalyst unit having two different catalysts which are not in direct contact but are merely located close to one another on the catalyst unit. Between them is the open-pored carrier. This carrier can, for example, be configured as a disk through which the exhaust gas passes in a perpendicular direction. However, preference is given to using a wall flow filter as is used for removing soot particles from the exhaust gas of diesel engines as carrier.

Figure 1:
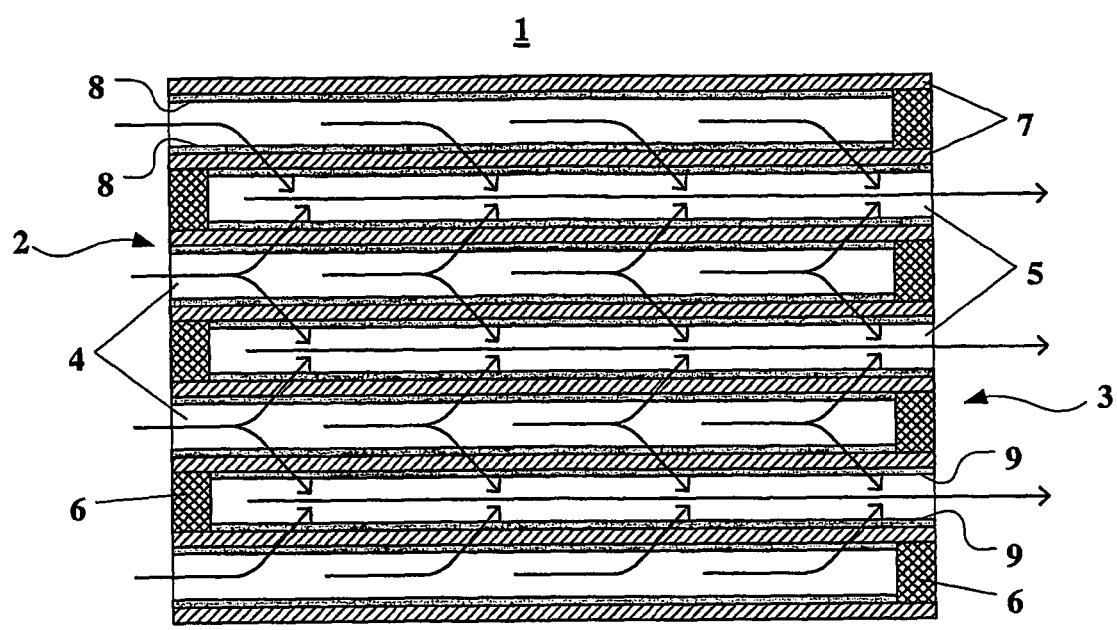
FIG. 1 shows the structure of a wall flow filter coated according to the invention.

FIG. 1 shows a cross section through the catalyst arrangement of the invention using a wall flow filter as carrier. A wall flow filter has a similar structure to the known honeycomb catalyst carriers made of a ceramic material. Such a honeycomb carrier (1) has a large number of closely spaced flow channels (4, 5) for the exhaust gas which pass through it from an entry face (2) to an exit face (3). In a wall flow filter, these flow channels are alternately closed by a ceramic plug (6), so that inlet channels (4) and outlet channels (5) are formed. Owing to this construction, the exhaust gas has to pass through the porous dividing walls (7) between the flow channels on its way from the entry face to the exit face of the carrier. The entry surface for the exhaust gas is in this case formed by the wall surfaces of the inlet channels (4) and carries the first catalyst layer (8). The wall surfaces of the outlet channels form the exit surface and are coated with the second catalyst layer (9).

The two catalyst layers (8, 9) are separated physically by the porous carrier. It has been found to be advantageous to keep the thickness of the carrier as small as possible. Preference is given to the entry and exit surfaces being at a distance of less than 1 mm, in particular less than 0.5 mm, from one another. The carrier has to have an open-pored structure so that exhaust gas can flow through it. Preference is given to using carriers made of a ceramic material such as cordierite, silicon carbide or aluminum titanate.

The catalysts are applied in the form of dispersion coatings to the entry and exit surfaces of the catalyst arrangement. These coatings comprise finely particulate, oxidic support materials to which the catalytically active components have been applied in finely divided form. The particle diameters of the oxidic support materials are usually in the range from 5 to 9 μm, and the catalyst barely penetrates, depending on the chosen mean pore diameter of the filter material, into the filter body.

In contrast, impregnation with a solution of precursor compounds of catalytically active components leads to penetration of the filter body by these components. It has been found that the advantageous separation of the two catalyst layers can also be achieved to a sufficient extent when one of the two catalysts is introduced by impregnation into the filter body itself and the second catalyst is then applied in the form of a dispersion coating to the entry or exit surface of the filter body.

In principle, entry surface and exit surface can be coated with various combinations of different catalysts. Useful combinations are a three-way catalyst or a nitrogen oxide storage catalyst on the entry surface and an SCR catalyst on the exit surface, and the combination of an SCR catalyst, a nitrogen oxide storage catalyst, an HC-DeNOx-catalyst or a hydrocarbon storage material on the entry surface with a diesel oxidation catalyst on the exit surface. Likewise, a three-way catalyst on the entry surface can be combined with a nitrogen oxide storage catalyst on the exit surface. The combination of a nitrogen oxide storage catalyst on the entry surface with a diesel oxidation catalyst on the exit surface is also advantageous.

To treat the exhaust gas of lean burn engines, preference is given, according to the invention, to a catalyst (8) being applied to the entry surface which can adsorb at least part of the nitrogen oxides present in the exhaust gas under lean operating conditions and, under rich exhaust gas conditions, convert part of the desorbed nitrogen oxides into ammonia. To carry out the selective catalytic reduction, the exit surface is coated with an SCR catalyst (9).

The catalyst (8) can in this case be a nitrogen oxide storage catalyst or a three-way catalyst. While in the case of a nitrogen oxide storage catalyst, the nitrogen oxide storage function under lean exhaust gas conditions is particularly pronounced and the capability of forming ammonia from the stored nitrogen oxides is a by-product, these circumstances are precisely reversed in the case of a three-way catalyst. However, it is also possible to use catalysts which lie between these two extremes, for example a three-way catalyst whose storage capability for nitrogen oxides has been increased by addition of nitrogen oxide storage components. The catalyst on the entry surface can also be a double-layer catalyst in which one layer is formed by a nitrogen oxide storage catalyst and the second layer is formed by a three-way catalyst.

The optimum composition of the catalyst on the entry surface of the carrier depends finally on the properties of the internal combustion engine and the spectrum of pollutants in its emissions and can be determined by a person skilled in the art by means of simple tests. The conversion of the nitrogen oxides by means of the proposed catalyst arrangement can also be optimized for a given catalyst for the entry surface by appropriate programming of the engine control system.

The exhaust gas from the internal combustion engine which is to be treated is, in the catalyst arrangement of the invention, passed firstly through the catalyst layer on the entry surface of the carrier, then through the porous carrier and immediately afterward through the SCR catalyst on the exit surface. As will be shown by the examples, this arrangement leads to significantly improved conversion of the nitrogen oxides compared to the known series arrangement of two separate catalyst units comprising a nitrogen oxide storage catalyst and an SCR catalyst.

The experimental results make it obvious that a synergistic effect is present here. The reasons for this are presumably the very short distance to be covered between exit from the catalyst on the entry surface and entry into the catalyst on the exit surface. In addition, in the catalyst arrangement of the invention, the exhaust gas is forced to flow through the catalyst layers, while in the case of conventional honeycomb catalysts the exhaust gases are conveyed tangentially past the catalyst layers and interaction with the catalyst layer takes place only via diffusion effects. Contrary to that, forced interaction with the catalyst layers takes place in the case of the catalyst arrangement of the invention.

A further advantage of this arrangement is that the catalyst layer comprising a noble metal on the entry surface is clearly separated from the SCR catalyst applied to the exit surface by the essentially inert, porous carrier. This is because the physical separation reduces a possibly damaging interaction between the two different catalysts. Thus, it is known that vanadium-containing SCR catalysts can become deactivated on contact with other high surface area supported catalysts as a result of thermal migration of the vanadium.

The catalysts used for the catalyst layer on the entry site is preferably a nitrogen oxide storage catalyst which comprises basic compounds of the alkaline earth metals for storing the nitrogen oxides and catalytically active platinum group metals. As alkaline earth metals, preference is given to using barium and/or strontium which can be incorporated in the catalyst in the form of oxides, hydroxides or carbonates. Preferred platinum group metals are platinum and/or rhodium which have been applied in finely divided form to a separate support material such as active aluminum oxide, cerium oxide, zirconium oxide, silicon dioxide or titanium oxide or to a cerium/zirconium mixed oxide. Especially preferred is a nitrogen oxide storage catalyst which comprises barium carbonate as storage component and platinum and rhodium on a cerium/zirconium mixed oxide and, in addition, active aluminum oxide.

The SCR catalyst on the exit site preferably comprises at least one zeolite exchanged with a transition metal, in particular with iron, copper, cerium or manganese. As an alternative, it is also possible to use a catalyst based on a solid state acid system $TiO_2/WO_3/MoO_3/V_2O_5/SiO_2/SO_3$. Preferred solid state acid systems are $TiO_2$ or $TiO_2/Al_2O_3$ or $TiO_2/SiO_2$ in combination with $V_2O_5$ or $V_2O_5/WO_3$ or $V_2O_5/MoO_3$.

In the following studies, the nitrogen oxide conversions which could be achieved using a nitrogen oxide storage catalyst and an SCR catalyst in various combinations were measured as a function of the exhaust gas temperature upstream of the catalyst arrangement. Nitrogen oxide storage catalyst and SCR catalyst had the following compositions.

Nitrogen Oxide Storage Catalyst:

To produce the nitrogen oxide storage coatings, a cerium/zirconium mixed oxide (weight ratio 70/30) was firstly loaded with platinum and rhodium in a weight ratio of 10/1 by pore volume impregnation. This material was then processed together with aluminum oxide and barium carbonate to form a coating suspension.

SCR Catalyst:

An H-ZSM-5 zeolite (molar ratio of $SiO_2/Al_2O_3=40$) was exchanged with iron to its exchange capacity by solid state ion exchange using iron chloride ($FeCl_3$) and subsequently suspended in water. The exchanged zeolite contained 3.5% by weight of iron, calculated as oxide.

Comparative Example 1

The entry surface of a wall flow filter made of cordierite and having a diameter of 25.4 mm, a length of 152.4 mm and a cell density of 46.5 $cm^{-2}$ (300 cpsi) was coated with the coating suspension for the nitrogen oxide storage catalyst. After removal of excess coating suspension, the coating was dried and calcined at 500° C. The coated filter had a coating concentration of 150 g per liter of filter body, of which 1.94 g/l was platinum and 12.1 g/l was barium, calculated as barium oxide.

The nitrogen oxide storage catalyst produced in this way will hereinafter be referred to as catalyst arrangement C1.

Comparative Example 2

A further nitrogen oxide storage catalyst was produced as described in comparative example 1 and combined with an SCR catalyst which had been obtained by coating the entry surface of a further filter body with the zeolite suspension, drying it and calcining it. The coating concentration in this case was 100 g/l of filter body.

The nitrogen oxide storage catalyst and downstream SCR catalyst form the catalyst arrangement C2.

Comparative Example 3

The entry surface of a further filter body having the above-mentioned dimensions was coated with a double layer of the SCR catalyst and the nitrogen oxide storage catalyst. For this purpose, the entry surface of the filter body was coated firstly with the SCR catalyst (100 g/l) and then with the nitrogen oxide storage catalyst (150 g/l).

The finished catalyst had a total coating concentration of 250 g/l of filter body, of which 1.94 g was platinum and 12.1 g was barium, calculated as oxide. It will hereinafter be referred to as catalyst arrangement 3.

Example 1

A further filter body was coated according to the invention on its entry surface with the nitrogen oxide storage catalyst (150 g/l) and on its exit surface with the SCR catalyst (100 g/l).

This catalyst will be referred to as catalyst arrangement 4.

Application Example

The catalyst arrangements described were examined in a model gas unit in respect of their nitrogen oxide conversions as a function of the exhaust gas temperature upstream of the catalyst arrangement.

On the model gas unit, the catalyst arrangements were alternatively exposed to lean and rich model exhaust gas and the nitrogen oxide conversions were determined. The test conditions are reported in the following table.

TABLE 1

Test conditions

| | | Operating phases | |
|---|---|---|---|
| | | lean | rich |
| Time | [s] | 80 | 10 |
| λ*) | | 1.5 | 0.8 |
| NO | [ppm by volume] | 500 | 500 |
| O2 | [% by volume] | 8 | 0 |
| CO2 | [% by volume] | 10 | 10 |
| HC | [ppm by volume] | 300 | 300 |
| CO | [% by volume] | 0 | 4 |
| H2 | [% by volume] | 0 | 1.3 |

TABLE 1-continued

| | | Test conditions | |
|---|---|---|---|
| | | Operating phases | |
| | | lean | rich |
| H2O | [ppm by volume] | 10 | 10 |
| N2 | | balance | balance |
| Space velocity | [h$^{-1}$] | 26.000 | 26.000 |
| Volume flow | [standard m$^3$/h] | 1931 | 1931 |

*)λ: Air ratio (air/fuel ratio standardized to stoichiometric conditions)

Figure 2:
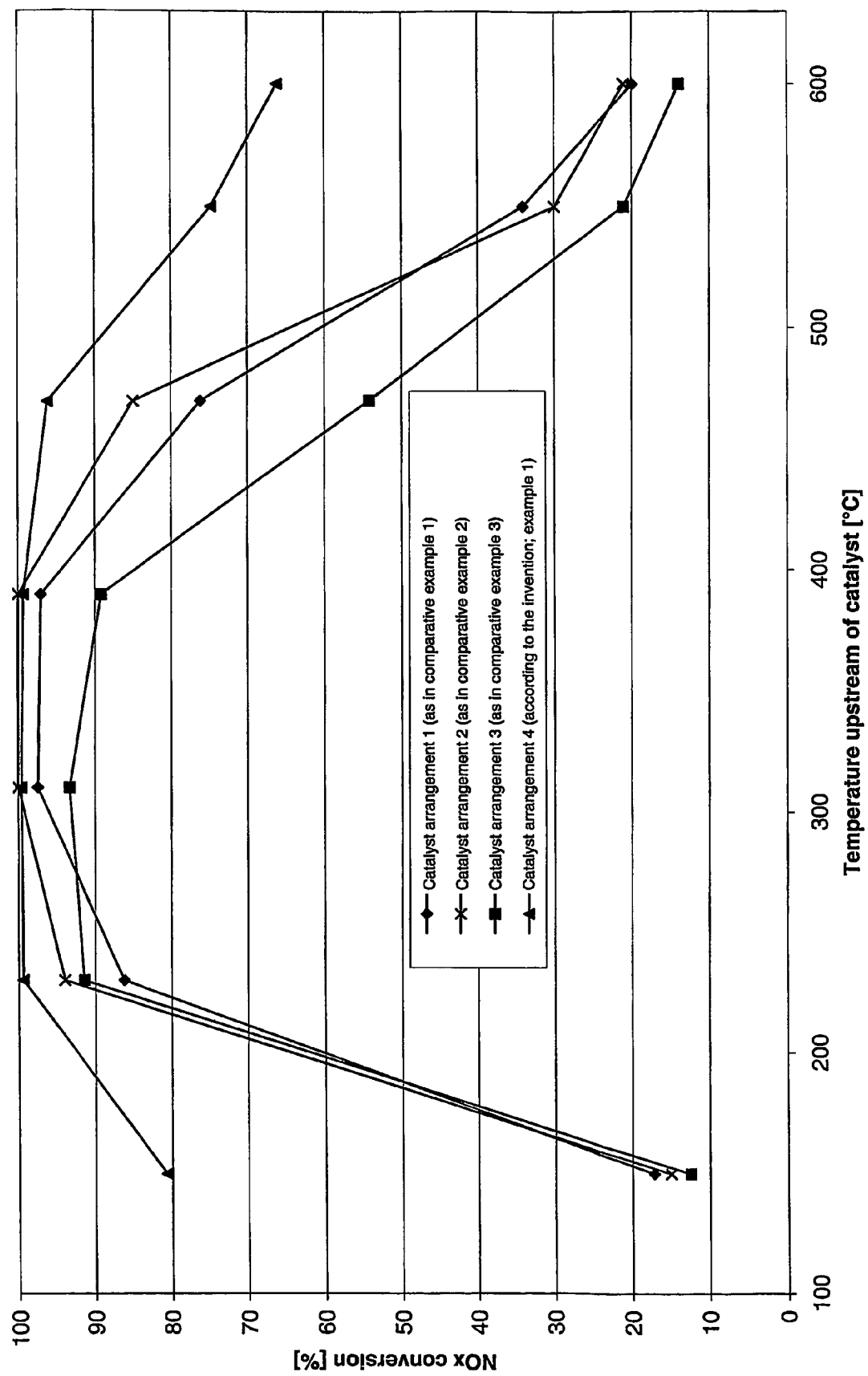
FIG. 2 shows NOx conversion curves for the catalyst arrangements 1 to 4 described in the examples.

The measured results are shown in FIG. 2.

Catalyst arrangement 1 consists only of a nitrogen oxide storage catalyst. The NOx conversion curve shown in FIG. 2 is typical of such a catalyst. In comparison with catalyst arrangement 1, catalyst arrangement 2 has an SCR catalyst arranged downstream of the nitrogen oxide storage catalyst on a separate carrier. This enables the NOx conversions to be increased, especially in the temperature range above 230° C., but the width of the conversion curve remains approximately unchanged. Below 230° C., the NOx conversions achieved by the NOx storage catalyst alone and in combination with the SCR catalyst are virtually identical. At these low temperatures, the SCR catalyst does not achieve any conversion in the present, NO$_2$-free model exhaust gas.

When SCR catalyst and nitrogen oxide storage catalyst are applied as a double layer to the entry side of the carrier (catalyst arrangement 3), the conversion curve deteriorates significantly compared to the sole use of a nitrogen oxide storage catalyst. At temperatures above 300° C., this catalyst arrangement gives lower conversion rates than a pure nitrogen oxide storage catalyst. This is attributable to partial poisoning of the SCR catalyst by traces of noble metal from the nitrogen oxide storage catalyst. At relatively high temperatures, these lead to partial oxidation of the ammonia stored in the SCR catalyst under lean operating conditions, for example to form NO. This demonstrates the adverse effect of direct contact between noble metal catalyst and SCR catalyst.

In contrast, catalyst arrangement 4 according to the invention displays a significant improvement in the NOx conversion curve, both in terms of the maximum and in terms of the width of the curve. This demonstrates the abovementioned synergistic effect of the two catalyst layers which closely follow one another in the flow direction of the exhaust gas. Although this arrangement is identical to catalyst arrangement 2 in respect of the catalyst sequence in the flow direction of the exhaust gas, the arrangement according to the invention gives a significant improvement in the conversion curve. This could not have been expected on the basis of the known catalyst arrangements on separate carrier bodies. The catalyst arrangement of the invention displays a significantly improved activity over the entire temperature range, in particular in the low-temperature and high-temperature ranges.

What is claimed is:

1. A catalyst arrangement for purifying the exhaust gases of internal combustion engines, which comprises an open-pored, porous carrier having an entry surface and an exit surface for the exhaust gas, wherein the entry and exit surfaces of the carrier are coated with different, catalytically active layers, with the catalyst layer on the exit surface being formed by a catalyst for selective catalytic reduction and the catalyst layer on the entry surface being able to store nitrogen oxides under lean exhaust gas conditions and to convert nitrogen oxides into ammonia under rich exhaust gas conditions, wherein the open-pored, porous carrier is a wall flow filter.

2. A catalyst arrangement according to claim 1, wherein the catalyst layer on the entry surface is formed by a nitrogen oxide storage catalyst.

3. A catalyst arrangement as claimed in claim 2, wherein the nitrogen oxide storage catalyst comprises basic compounds of the alkaline earth metals and catalytically active platinum group metals.

4. A catalyst arrangement as claimed in claim 3, wherein the nitrogen oxide storage catalyst comprises platinum and rhodium on a cerium/zirconium mixed oxide and, in addition, active aluminum oxide and barium carbonate.

5. A catalyst arrangement as claimed in claim 1, wherein the SCR catalyst comprises at least one zeolite exchanged with a transition metal.

6. A catalyst arrangement as claimed in claim 1, wherein the SCR catalyst comprises a solid state acid system selected from the group consisting of titanium oxide or titanium oxide/aluminum oxide or titanium oxide/silicon dioxide in combination with vanadium, vanadium/tungsten oxide or vanadium/molybdenum oxide.

7. A catalyst arrangement as claimed in claim 1, wherein the catalyst layer on the entry surface is formed by a three-way catalyst.

8. A catalyst arrangement as claimed in claim 7, wherein the three-way catalyst comprises at least one noble metal from the platinum group on a high surface area support material and, in addition, at least one oxygen storage component based on cerium oxide.

9. A method of purifying the exhaust gas of internal combustion engines operated under lean conditions with the air/fuel mixture supplied to the engine changing cyclically from lean to rich, wherein the exhaust gas is supplied to an open-pored, porous carrier having an entry surface and an exit surface and the carrier is a wall flow filter, and a catalyst layer on the exit surface is formed by a catalyst for selective catalytic reduction and a catalyst layer on the entry surface is able to store nitrogen oxides under lean exhaust gas conditions and to convert nitrogen oxides into ammonia under rich exhaust gas conditions.

* * * * *